2,700,613
PRESERVATION OF RAW, DENUDED POTATOES

James D. Smith and Harry J. Krause, Oklahoma City, Okla.

No Drawing. Application April 26, 1952,
Serial No. 284,652

6 Claims. (Cl. 99—154)

This invention relates to a process or method of preventing contamination to or freeing from enzyme bacteria, certain food products such as vegetables, fruits and the like, and specifically potatoes and sweet potatoes in their denuded raw state, said products being characterized by their tendency to produce enzymatic spoilage, if not protected. The process also relates to a manner of rendering all such products capable of being marketed in both their whole or sized forms in fresh and marketable condition during comparatively long periods of time, without their again becoming contaminated by such enzyme bacteria, and such enzymatic spoilage.

The primary object of this invention is to prevent contamination of vegetable products from enzyme bacteria by surface treatment of the products in the raw denuded state.

Another object is to prevent contamination of such products from enzyme bacteria, without chemically altering the product, and without materially changing the color thereof.

A further object is to prevent the formation of enzyme bacteria on the product, by surface treatment in the denuded raw state without altering the product and without changing its color or appearance except by a slight bleaching, and without reducing its food value.

Yet another object is to provide a food product comprising fresh, whole and/or sized portions of peeled raw potatoes, or peeled raw sweet potatoes, or the like, so processed as to prevent material discoloration or deterioration.

An additional object of the invention is the freeing of certain food products such as vegetable fruits and the like, such as potatoes, and sweet potatoes, from the effect of enzyme bacteria.

Another object is to free such products from the effect of enzyme bacteria even after enzymatic spoilage has begun.

In its raw state the white potato, and sweet potato, in common with certain other vegetables and fruits, is susceptible to enzymatic action when exposed to the atmosphere, causing rapid discoloration and deterioration and oxidation.

It has been known that discoloration can be retarded or partially neutralized either by a method of cooking, or by an addition of some neutralizing agent.

Such suggested reagents have not shown sufficient promise to justify their use commercially. They have been proven to be too expensive, or have materially changed the flavor of the product or caused it to be soft and undesirable. Certain other re-agents which will partially retard or neutralize this oxidation are known to be deleterious, and objectionable, and are inhibited except under certain limitations under the Food and Drug Act.

We propose to accomplish our desired object without previously heating or cooking the product, and while it is in the denuded raw state, by dissolving phosphoric acid, benzoate of soda, propylene glycol, and sodium meta bisulfite in unheated water in a treating tank in the proportions hereinafter named, then submerging the product therein for a period of from 10 to 100 seconds, in said solution at a temperature of not below 50° F. and not above 115° F. without thereby cooking the product then withdrawing the product and draining for packaging.

In this treatment enzymatic bacteria is prevented and enzymatic bacteria is destroyed, and the product is preserved for a period of several days against spoilage when kept under normal refrigeration.

The phosphoric acid prevents and destroys enzymatic bacteria. The sodium benzoate preserves the product. The propylene glycol helps to keep the cooking fat from rancidity when used over and over, as is often the case in hotels and restaurants. The sodium meta bisulfite has a slight bleaching effect on the product; the phosphoric acid also steps-up or increases the efficiency of the sodium meta bisulfite to produce a better bleaching effect with a lesser percent of sodium meta bisulfite.

The treatment of the potato and the sweet potato may vary. The potato and sweet potato being living tubers react differently during their various ages in which they are being treated throughout the year. Therefore the intended process solution will be re-adjusted limitedly to care for the respective changes in the state in which the potato and sweet potato are when treated.

It will be understood that the treatment herein described as applied to potatoes and sweet potatoes can also be applied to various other vegetables, and fruits.

The percentages of the chemicals hereinabove referred to, to be given later herein, range as follows: water by volume ninety-four and three-tenths to ninety-eight and four-tenths percent, phosphoric acid from one-half of one percent to four percent by volume, propylene glycol not less than one-half percent and not more than one and one-half percent, by volume, sodium benzoate not less than one-twentieth of one percent and not more than one-tenth of one per cent by volume, sodium meta bisulfite not less than one-twentieth of one percent and not more than one-tenth of one per cent by volume.

It is preferred that the process be applied at the ordinary room temperature, and the temperature of the solution at the time of submergence should be not below 50° F. and be not above 115° F., and the time of submergence be not below 10 seconds, and be not above 100 seconds.

Under extraordinary circumstances it may be found necessary to vary these owing to the condition of the product to be treated, but if the proportions are followed such occasions, it is believed, will be found to be rare.

The danger in most food preservations wherein sodium meta bisulfite is an element, is the danger of injury to human beings therefrom and to keep it confined within the requirements of the Food and Drug Act. In applicants' invention the amount of preservative required is so much less than their prodecessors owing to the discovery of the peculiar effect the phosphoric acid has in stepping up the effect of the smaller quantity of sodium meta bisulfiite thereby minimizing the amount thereof required to bleach the product to the extent desired.

We do not herein account for the effect the phosphoric acid has on stepping up the bleaching effect of the sodium meta bisulfite, but it is a fact that such effect ensues.

We believe it will be apparent that we have invented a product for and a process of treating denuded raw fruits and vegetables, and particularly potatoes and sweet potatoes, which will be a great benefit to those serving the public in varying numbers and in large and small quantities from day to day; which does not require cooking, and which is effective in a comparatively low degree of heat in ordinary room temperature; which prevents discoloration with a very slight degree of bleaching; and produces the product in more perfect and purer form.

It will be understood that the details given are for the purpose of illustration, and that variations within the spirit of the invention are intended to be included within the scope of the appended claims.

What we claim is:

1. A commodity for treating denuded raw white potatoes and sweet potatoes for the purposes set forth, including: phosphoric acid not less than one percent and not more than four percent by volume; propylene glycol not less than one-half percent and not more than one and one-half percent by volume; sodium benzoate not less than one-twentieth of one percent and not more than one-tenth of one percent by volume; and sodium meta bisulfite not less than one-twentieth of one percent and not more than one-tenth of one percent by volume; and water not more than ninety eight and four-tenths percent and not less than ninety four and three-tenths percent by volume, of the whole.

2. A commodity for treating denuded raw white potatoes and sweet potatoes for the purposes set forth, including: phosphoric acid from one-half of one percent to four percent by volume; propylene glycol not less than one-half percent and not more than one and one-half percent by volume; sodium benzoate not less than one-twentieth of one percent and not more than one-tenth of one percent by volume; and sodium meta bisulfite not less than one-twentieth of one percent and not more than one-tenth of one percent by volume; and water not more than ninety eight and four-tenths percent and not less than ninety four and three-tenths percent by volume, of the whole.

3. The process of treating denuded raw white potatoes and sweet potatoes, for the purposes set forth, including: submerging the product in a treating tank in a solution comprising water from ninety four and three-tenths percent to ninety eight and four-tenths percent of the whole, by volume; phosphoric acid from one percent to four percent, by volume; propylene glycol from one-half of one percent to one and one-half percent by volume; sodium benzoate from one-twentieth of one percent to one-tenth of one percent by volume; and sodium meta bisulfite from one-twentieth of one percent to one-tenth of one percent by volume; and permitting said submergence to continue not less than ten seconds nor more than one hundred seconds, and then withdrawing the product and draining it for packaging.

4. The process of treating denuded raw white potatoes and sweet potatoes, for the purposes set forth, including: submerging the product in a treating tank in a solution comprising water from ninety four and three-tenths percent to ninety eight and four-tenths percent of the whole, by volume; phosphoric acid from one-half of one percent to four percent by volume; propylene glycol from one-half percent to one and one-half percent by volume; sodium benzoate from one-twentieth of one percent to one-tenth of one percent by volume; and sodium meta bisulfite from one-twentieth of one percent to one-tenth of one percent by volume; and permitting said submergence to continue not less than ten seconds and not more than one hundred seconds, and then withdrawing the product and draining it for packaging.

5. The process of freeing raw white potatoes and sweet potatoes from contamination from enzyme bacteria including: denuding the product of their outer covering, and submerging it for the purposes set forth, at a temperature not below 50° F. and not above 115° F. in ordinary room temperature, in a water dilute solution comprising ninety four and three-tenths percent to ninety eight and four-tenths percent water, by volume; phosphoric acid from one percent to four percent, by volume; propylene glycol from one-half percent to one and one-half percent, by volume; from one-twentieth percent to one-tenth of one percent sodium benzoate, by volume; from one-twentieth percent to one-tenth of one percent sodium meta bisulfite, by volume, and retaining said submergence for a period of from ten to one hundred seconds, then withdrawing the product and draining it for packaging.

6. The process of freeing raw white potatoes and sweet potatoes from contamination from enzyme bacteria including: denuding the product of their outer covering, and submerging it whole or divided for the purposes set forth, at a temperature not below 50° F. and not above 115° F. in ordinary room temperature, in a water dilute solution comprising ninety four and three-tenths to ninety eight and four-tenths percent water, by volume; phosphoric acid from one-half of one percent to four percent, by volume; from one-half percent to one and one-half percent propylene glycol, by volume; from one-twentieth of one percent to one-tenth of one percent sodium meta bisulfite, by volume, and retaining said submergence for a period of from ten to one hundred seconds, then withdrawing the product and draining it for packaging.

References Cited in the file of this patent

UNITED STATES PATENTS

| | | |
|---|---|---|
| 2,506,793 | Kalmar et al. | May 9, 1950 |
| 2,511,804 | Hall | June 13, 1950 |

FOREIGN PATENTS

| | | |
|---|---|---|
| 541 | Australia | Aug. 17, 1936 |